US008417648B2

(12) United States Patent
Hido et al.

(10) Patent No.: US 8,417,648 B2
(45) Date of Patent: Apr. 9, 2013

(54) CHANGE ANALYSIS

(75) Inventors: Shohei Hido, Kanagawa-ken (JP);
Ysuyoshi Ide, Kanagawa-ken (JP);
Hisashi Kashima, Kanagawa-ken (JP);
Harunobu Kubo, Kanagawa-ken (JP);
Hirofumi Matsuzawa, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1038 days.

(21) Appl. No.: 12/372,545

(22) Filed: Feb. 17, 2009

(65) Prior Publication Data
US 2009/0222389 A1 Sep. 3, 2009

(30) Foreign Application Priority Data

Feb. 29, 2008 (JP) .................................. 2008-49729

(51) Int. Cl.
G06E 1/00 (2006.01)
G06F 15/00 (2006.01)
(52) U.S. Cl. ............................... 706/12; 706/10; 706/20
(58) Field of Classification Search .................. None
See application file for complete search history.

(56) References Cited

U.S. PATENT DOCUMENTS

| | | | |
|---|---|---|---|
| 2007/0021918 A1* | 1/2007 | Natsoulis et al. | 702/19 |
| 2007/0179363 A1* | 8/2007 | Stupp et al. | 600/301 |
| 2007/0219433 A1* | 9/2007 | Stupp | 600/300 |
| 2008/0025591 A1* | 1/2008 | Bhanot et al. | 382/132 |
| 2008/0033658 A1* | 2/2008 | Dalton et al. | 702/19 |

FOREIGN PATENT DOCUMENTS

| | | |
|---|---|---|
| JP | 2000132558 A | 5/2000 |
| JP | 2001-022776 | 1/2001 |
| JP | 2003-316797 | 11/2003 |
| JP | 2004157814 A | 6/2004 |
| JP | 2005-208709 A | 8/2005 |

OTHER PUBLICATIONS

Takahashi et al., F., "Decision-Tree-Based Multiclass Support Vector Machines", Proc. of the 9th International Conference on Neural Information Processing, vol. 3, pp. 1418-1422, 2002.*

Fang Li et al., Supervised Learning for Change-Point Detection, International Journal of Production Research, vol. 44, No. 14, Jul. 15, 2006, 2853-2868, Taylor & Francis.

Hironori Takeuchi et al., Automatic Identification of Important Segments and Expressions for Mining of Business-Oriented Conversations at Contact Centers, Proceedings of the 2007 Joint Conference on Empirical Methods in Natural Language Processing and Computational Natural Language Learning, pp. 458-467, Prague, Jun. 2007, Association for Computational Linguistics.

(Continued)

*Primary Examiner* — Jeffrey A Gaffin
*Assistant Examiner* — Adrian Kennedy
(74) *Attorney, Agent, or Firm* — Shimokaji & Assoc., PC

(57) ABSTRACT

Different virtual labels, for example, like +1 and −1, are assigned to two data sets. A change analysis problem for the two data sets is reduced to a supervised learning problem by using the virtual labels. Specifically, a classifier such as logical regression, decision tree and SVM is prepared and is trained by use of a data set obtained by merging the two data sets assigned the virtual labels. A feature selection function of the resultant classifier is used to rank and output both every attribute contributing to classification and its contribution rate.

20 Claims, 11 Drawing Sheets

OTHER PUBLICATIONS

Victor Eruhimov et al., Change-Point Detection with Supervised Learning and Feature Selection, ICINCO 2007—International Conference on Informatics in Control, Automation and Robotics, pp. 359-363.

Hiroyuki Itakura et al., "Rough Set-Aided Selection for Aitomatic Web Page Classification" IPSJ SIG Technical Report, Information Processing Society of Japan, Aug. 6, 2004, vol. 2004, No. 85 p. 147-154.

Akinori Fujino et al., "Multi-Labeling of Documents Based on F-Score Maximization" IPSJ SIG Technical Reports, Information Processing Society of Japan, Sep. 25, 2007, vol. 2007, No. 94 p. 29-34.

Hirofumi Matsuzawa et al., "Unsupervise Change Analysis Using Supervised Learning" Journal of the IEICE, The Institute of Electronics, Information and Communication Engineers, Jun. 1, 2010, vol. J93-D, No. 6 p. 816-825.

\* cited by examiner

CHANGE ANALYSIS

BACKGROUND OF THE INVENTION

The present invention relates to a data analysis technique and in particular, to a system for performing change analysis.

A change detection problem is one of the fields of data analysis. Traditionally, a change detection problem is formulated as a statistical test problem for the probability distribution in a data set of interest.

Detecting a change in data has great significance from an engineering standpoint. One application example of such change detection is an automobile fault diagnosis. More specifically, the automobile fault diagnosis aims to identify which component to replace in an automobile having some trouble. To this end, sensor data on the automobile under normal conditions is previously stored, and then the sensor data is compared with data obtained from the automobile having some trouble. In this diagnosis, what one wants to know is not information on whether the obtained data is different as a whole from the reference data, but detailed information on which parameter causes any change.

Another application example of change detection is a change analysis on a customer profile list. There is a demand, for example, for obtaining information to develop a marketing strategy, by comparing a list of customer profiles of the January-March quarter of this year with the list of customer profiles of the January-March quarter of the last year. Specifically, if a company is losing customers having a certain attribute, the company desires to know how to stop such customer attrition.

In this way, in the field of data analysis, data is analyzed to form a model of a structure underlying the data, and the model is used to obtain some kind of knowledge or to make decisions. For example, in analyzing customer profiles for marketing, value can be found in what one wants to know in information on which attribute is involved in a change between two data sets, assuming that there is the change between two lists, rather than in the information on whether or not there is a change between the two lists.

In other words, it is often the case that detailed information such as "how and what change has occurred" is more necessary than bulk information such as "whether or not a change has occurred" in practice. In the description of this application, to find out detailed information on how and what change has occurred is referred to as a change analysis.

In order to formally define this problem, let's consider a data set $X_A$ composed of $N_A$ vectors and a data set $X_B$ composed of $N_B$ vectors. The formulas of these data sets are expressed as follows.

$$X_A = \{x_A^{(1)}, x_A^{(2)}, \ldots x_A^{(N_A)}\}$$

$$X_B = \{x_B^{(1)}, x_B^{(2)}, \ldots x_B^{(N_B)}\} \quad \text{[Formula 1]}$$

Here, it is assumed that all the elements in each data set are same-dimensional (d-dimensional) vectors. The change detection problem is a problem for figuring out a difference between $X_A$ and $X_B$ to determine the significance of the difference, whereas the change analysis problem is a problem for expressing, given $X_A$ and $X_B$, a rule explaining a difference between $X_A$ and $X_B$ by use of data attributes. These two problems are solved without being given any prior information as to the presence/absence of a difference. Accordingly, in machine learning terms, these problems are categorized in a class of unsupervised learning.

The foregoing problems are usually treated through two sample tests in statistics. There are several types of two sample tests. Here, consider a two sample test for a normal population, for example. Based on the assumption that the data set $X_A$ follows a multivariate Gaussian distribution of a variance-covariance matrix $\Sigma_A$ having a mean vector $\mu_A$, this two sample test gives an answer stating whether or not the data set $X_B$ also follows the same Gaussian distribution. At this time, except for a special case where the two variance-covariance matrices can be assumed to be the same (that is, the case where $\Sigma_A = \Sigma_B$), it is not easy to find out which attribute of the data produces a difference between these two data sets. If a data sample is of a ten or more dimensional vector, it is almost impossible to identify an attribute producing a difference on the basis of the finite values of a covariance matrix. In other words, the two sample test gives a solution, as a result of hypothesis testing, indicating whether or not there is a difference between two distributions, but does not give any particular indicator from the viewpoint of the change analysis problem. This is also true in the case of using other formulations using any kinds of distance (a likelihood ratio, a Kolmogorov-Smirnov statistic, a Bregman divergence and the like) of a probability distribution.

Japanese Patent Application Publication No. 2001-22776 teaches a method of comparing sets of correlation rules extracted at different time points with each other in order to detect a temporal change in a database. However, this correlation rule is only a rule for simply counting co-occurrences of two items, and is not applicable to change analysis on the aforementioned automobile fault diagnoses and customer profile list. In addition, this method also has a problem in principle that an important rule may be buried in trivial rules.

Japanese Patent Application Publication No. 2003-316797 discloses that a feature analysis is performed on a multidimensional data set by focusing on a data sample of a particular dimension or data item of the multidimensional data set in which there is a change. In particular, in this technique, there are prepared a data extraction processing function and a designation table for storing a data sample of a dimension or a data item whose change is to be detected. The data extraction processing function determines whether or not the data of the dimension or data item designated in the designation table has changed from the data of the last extraction. If the data has changed, the data is stored in a multidimensional database for change analysis. This database is a database different from a multidimensional database for normal analysis. Then, the multidimensional database for change analysis is analyzed. However, Japanese Patent Application Publication No. 2003-316797 does not describe any specific technique for performing a change analysis even though describing the term of change analysis.

The following Fang Li, George C. Runge, Eugene Tuv, "Supervised learning for change-point detection," International Journal of Production Research, Vol. 44, No. 14, 15 Jul. 2006, 2853-2868 and Victor Eruhimov, Vladimir Martyanov, Eugene Tuv, George C. Runger, "CHANGE-POINT DETECTION WITH SUPERVISED LEARNING AND FEATURE SELECTION," ICINCO 2007—International Conference on Information in Control, Automation and Robotics disclose a change analysis in which feature selection is performed through supervised learning. According to this disclosed technique, the change analysis problem is reduced to a problem of supervised learning which receives input variables of a time-evolving process and outputs a time point. Thus, by means of this supervised learning, a variable having the average value changed is found from among multiple variables.

The technique of Fang Li, George C. Runge, Eugene Tuv, "Supervised learning for change-point detection," International Journal of Production Research, Vol. 44, No. 14, 15 Jul. 2006, 2853-2868 and Victor Eruhimov, Vladimir Martyanov, Eugene Tuv, George C. Runger, "CHANGE-POINT DETECTION WITH SUPERVISED LEARNING AND FEATURE SELECTION," ICINCO 2007—International Conference on Information in Control, Automation and Robotics, however, is capable of detecting only a change in the average value of a certain variable from among multiple variables, that is, only a relatively simple change. Thus, this technique has a limitation on its application to a complicated analysis target.

Note that, if, given labeled data, the problem can be originally dealt with as a problem of supervised learning (classification problem), it is not very difficult to technically combine change detection with classification. For instance, the following Hironori Takeuchi, Venkata Subramaniam, Tetsuya Nasukawa, and Shourya Roy, "Automatic Identification of Important Segments and Expressions for Mining of Business-Oriented Conversations at Contract Centers," Proceedings of the 2007 Joint Conference on Empirical Methods in Natural Language Processing and Computational Natural Language Learning, pp. 458-467, Prague, June 2007 discloses a method using a classifier to investigate a change point in a data set targeting a database of call log at a call center.

However, this method handles a data set attached with labels of success and failure in reservation agreement and uses a technique of investigating how the labeled data changes on the basis of $\chi^2$ statistic. Accordingly, this method is not directly applicable to general data set other than frequency data set.

In addition, Japanese Application No. 2008-49729 is an example of the related art.

SUMMARY OF THE INVENTION

It is an object of the present invention to provide a technique for solving a change analysis problem by reducing the problem to a supervised learning problem. This technique achieves greater general versatility and is applicable to a more complicated problem than the forgoing conventional techniques.

The present inventors came up with a technique using a classifier (hereinafter, referred to as a virtual classifier) working on virtual labels to solve a change analysis problem. More specifically, by means of this technique, a change detection problem and a change analysis problem for two data sets $X_A$ and $X_B$ are preferably solved at the same time using the virtual classifier.

Moreover, according to a preferred embodiment of the present invention, provided are
  a method for evaluating the degree of change by using the accuracy in classification of virtual labels by a classifier
  a method for evaluating the significance of a change by comparing the degree of change with a threshold that is derived from the confidence interval of a binomial distribution; and
  a method for solving a change analysis problem by use of an attribute selection function of the classifier with respect to the virtual labels.

A more specific procedure is as follows. To be more precise, according to the present invention, an appropriate binary classifier L is firstly prepared. Any of known logistic regression, decision tree and support vector machine (SVM) can be used as the binary classifier L.

Next, two data sets $X_A$ and $X_B$ are prepared. A virtual labeling section assigns virtual labels to data samples in the respective two data sets. The virtual labels can take any distinguishable values. For example, a label of +1 is assigned to each data sample in the data set $X_A$ while a label of −1 is assigned to each data sample in the data set $X_B$. Here, the sizes of the data sets $X_A$ and $X_B$ are denoted by $N_A$ and $N_B$, respectively. Then, the data sets labeled are merged into a labeled data set with the size $N_A+N_B$.

After that, the cross validation by k blocks (k is previously given as a parameter) is performed on the labeled data set with the size $N_A+N_B$ to figure out a classification accuracy p of a virtual classifier L. In addition, an accuracy allowable range $\gamma$ is obtained from a previously-given significance level $\alpha$ in a later-described method.

Then, a change is determined as significant if $p \geq p_{bi}(1+\gamma)$. If not, it is determined that there is no change.

Note that $p_{bi}$ is given in the following formula.

$$p_{bi} = \frac{\max\{N_A, N_B\}}{N_A + N_B} \quad \text{[Formula 2]}$$

A change analysis section trains the virtual classifier L by use of the labeled data set with the size $N_A+N_B$. Thereafter, by using a feature selection function of the virtual classifier L, every attribute contributing to the classification and its contribution rate are ranked and outputted.

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF THE INVENTION

Figure 1:
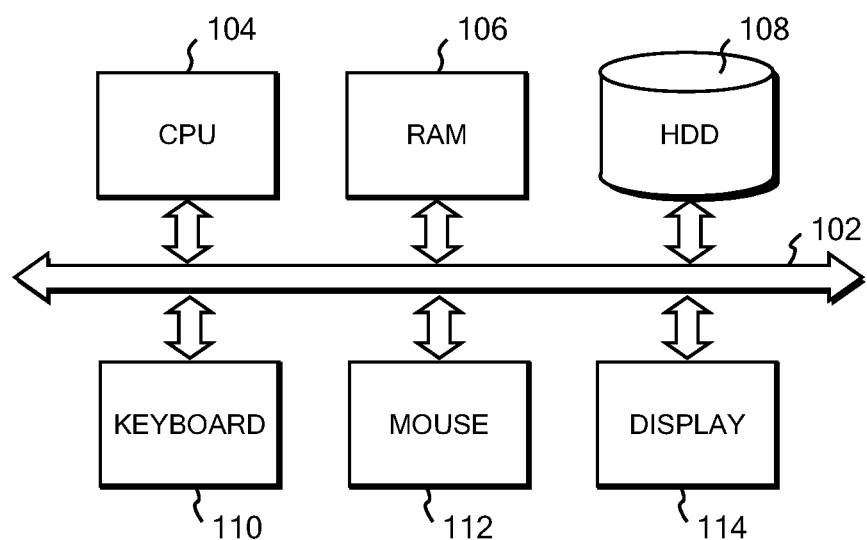
FIG. 1 is a block diagram of an outline of a hardware configuration.

According to the present invention, a change analysis problem, which is an unsupervised learning problem in nature, may be reduced to a supervised learning problem by use of a virtual classifier. As a result, provided is a system capable of solving a change analysis problem for an analysis target having a large number of variables within a realistic time period and with reliability, although it may be extremely difficult or almost impossible to solve such a change analysis problem by use of the conventional techniques. Examples of such a change analysis problems include problems of change analysis on the aforementioned automobile fault diagnoses and customer profile list.

Hereinafter, embodiments of the present invention will be described by referring to the drawings. It should be understood that these embodiments are used only to describe preferable modes of the present invention and that there is no intention that the scope of the present invention is limited to those described here. In addition, if not otherwise specified, the same reference numerals denote the same elements through the following drawings.

FIG. 1 shows a block diagram of computer hardware for implementing a system configuration and processing according to an embodiment of the present invention. In FIG. 1, a CPU 104, a main memory (RAM) 106, a hard disk drive (HDD) 108, a keyboard 110, a mouse 112 and a display 114 are connected to a system bus 102. Preferably, the CPU 104 is based on architecture of 32 bits or 64 bits. For example, Pentium (trademark) 4 or Core (trademark) 2 DUO of Intel Corporation, Athlon (trademark) of Advanced Micro Devices, Inc., or the like can be used. The main memory 106 has a memory capacity of preferably at least 512 KB, or more preferably at least 1 GB.

In the hard disk drive 108, an operating system and a processing program according to the present invention and the like are installed in advance, although not illustrated individually. The operating system may be any operating system compatible with the CPU 104, such as Linux (trademark), Windows Vista (trademark), Windows XP (trademark) and Windows (trademark) 2000 of Microsoft Corporation, and Mac OS (trademark) of Apple Incorporated.

The keyboard 110 and the mouse 112 are used to operate graphic objects such as an icon, a task bar and a window displayed on the display 114 in accordance with a graphic user interface provided by the operating system. The keyboard 110 and the mouse 112 may also be used to specify a file in which data for change analysis is stored.

The display 114 is preferably a 32 bit true color LCD monitor with a resolution of 1024×768 or greater, although not limited to this. The display 114 is used to display a graph of a result of change analysis and the like.

A program for carrying out change analysis processing of the present invention is also stored in the hard disk drive 108. This program can be written in any existing program language such as C++, C#, Java (trademark), Perl and Ruby. If Windows Vista, Windows XP (trademark), Windows (trademark) 2000 or the like is used as the operating system, the program can be implemented as an application program with a graphic user interface (GUI) using the function of Win32 API. Instead, the program for carrying out the change analysis processing of the present invention can also be implemented as a program with a character user interface (CUI).

Figure 2:
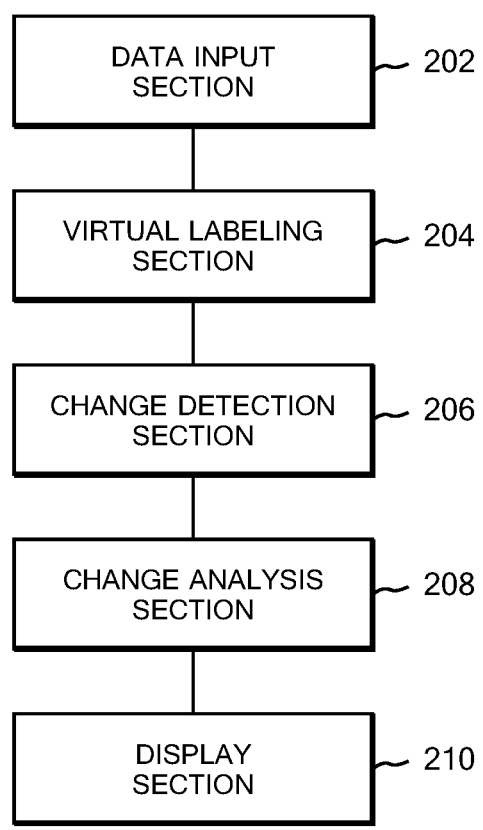
FIG. 2 is a block diagram of an outline of a logical configuration of functions.

FIG. 2 is a block diagram showing an outline of functions of the program for carrying out the change analysis processing of the present invention. Specifically, this program may be mainly composed of a data input section 202, a virtual labeling section 204, a change detection section 206, a change analysis section 208 and a display section 210. These sections may be each implemented as an individual module. Instead, one or more sections may be implemented as sub-modules included in a functional block. Those skilled in the art can come up with various implementation modes of this program.

The data input section 202 has functions of receiving data for analysis from a CD-ROM, a DVD, a USB-connected hard disk drive (unillustrated), a LAN-connected drive, a web server or the like, and of, as needed, converting the data into data in an internal data format to be processed by the virtual labeling section 204, the change detection section 206 and the change analysis section 208. One of preferable formats to be inputted to the data input section 202 is the CSV format, in which data is separated by commas. Instead of this, the data format to be used may be any computer readable format, such as the XML or Excel format, in which the data of multiple types of numeric values can be expressed.

The virtual labeling section 204 has a function of assigning different virtual labels to respective two data sets obtained by the data input section 202. Here, the two data sets may be compared with each other to find out a change.

The change detection section 206 has functions of deciding a significance level of change and of determining that there may be a change in the data set if the change satisfies this significance level. Note that, when it is apparent from the beginning that there may be a change between two data sets, the step of the detection by the change detection section 206 can be skipped.

The change analysis section 208 has a function of ranking and outputting both every attribute contributing to classification and its contribution rate when the change detection section 206 determines that there is a change.

The display section 210 displays, preferably as a graphic image, an output result by the change analysis section 208 on the display 114.

Note that the above description only shows the outline of the functions of the virtual labeling section 204, the change detection section 206 and the change analysis section 208. These functions will be described in detail below.

Figure 3:
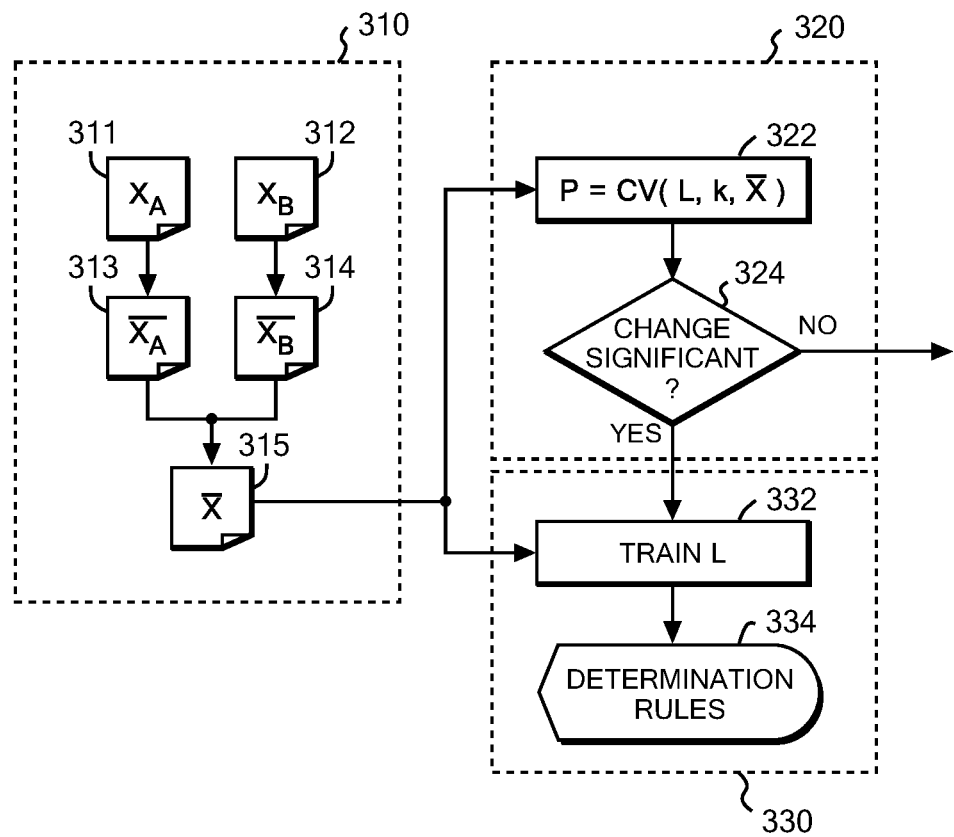
FIG. 3 is a flowchart of processing of the present invention.

FIG. 3 shows an entire flowchart corresponding to the functional block diagram in FIG. 2. In FIG. 3, a processing unit 310 corresponds to the data input section 202 and the virtual labeling section 204, a processing unit 320 corresponds to the change detection section 206, and a processing unit 330 corresponds to the change analysis section 208.

In the following description, a symbol shown below is called an X bar for convenience of description. If not otherwise specified, the X bar denotes a data set obtained by assigning a virtual label to the data set X in the description of the embodiment.

$$\overline{X} \qquad \text{[Formula 3]}$$

In the processing unit 310 in FIG. 3, a data set $X_A$ 311 and a data set $X_B$ 312 may be fetched to, preferably, the hard disk drive 108 by the data input section 202, and may be respectively assigned different labels by the virtual labeling section 204. The label may take any value. For example, the data set $X_A$ 311 may be assigned +1 while the data set $X_B$ 312 is assigned −1. {+2, −2}, {A, B} and the like can also be used as the labels. As a result, the data sets $X_A$ 311 and $X_B$ 312 may be turned into a data set $X_A$ bar 313 and a data set $X_B$ bar 314. The data set $X_A$ bar 313 and data set $X_B$ bar 314 may be further merged into a data set X bar 315.

The data set X bar 315 may be used in both a processing step 322 of the processing unit 320 and a processing step 332 of the processing unit 330.

In step 322, the processing unit 320 figures out classification accuracy p by use of a cross validation function or a sub routine CV. Specifically, the classification accuracy may be calculated from p=CV(L, k, X bar) where L denotes any appropriate classifier, k denotes an appropriate number of divided blocks, and the X bar denotes the data set X bar 315. The processing of the sub routine CV will be described in more detail below.

After the classification accuracy p is figured out in step 322, a determination may be made in step 324 as to whether the value of p exceeds a certain threshold. If yes, it may be determined that there is a significant change, and the processing moves to step 332. Then, the classifier L learns from the X bar.

In step 334, by use of a feature selection function of the classifier L, every attribute contributing to the classification and its contribution rate may be ranked and outputted together. Although FIG. 3 does not show any, the display section 210 also displays this output on the display 114 if necessary.

Hereinafter, prior to the detailed description for the processing of the steps in FIG. 3, general functions of the classifier are described as premises for the processing.

<General Description of Classifier>

The classifier may be generally expressed as a mathematical function F(x,w) for predicting y.

Here, x may denote a multi-dimensional vector, y may denote data classes (labels), for example, a set {−1, +1}, and w may denote a parameter of the classifier, and is expressed as a multi-dimensional vector, a matrix, or the like.

The learning of the classifier can modify w by use of a training set $X_t$: $\{(x_1,y_1), \ldots, (x_n,y_n)\}$ to minimize a function representing a prediction error, for example, a square error function $$\sum_{i=1}^{n}(F(x_i, w) - y_i)^2. \quad \text{[Formula 4]}$$

In the next step after the classifier having learned is prepared, the performance of the classifier may be tested by applying the classifier to a test set $X_s$: $\{(x'_1,y'_1), \ldots, (x'_m,y'_m)\}$. More specifically, taking the example of the square error function, the parameter w that minimizes the function $$\sum_{i=1}^{m}(F(x'_i, w) - y'_i)^2 \quad \text{[Formula 5]}$$

may be regarded as optimal.

Figure 4:
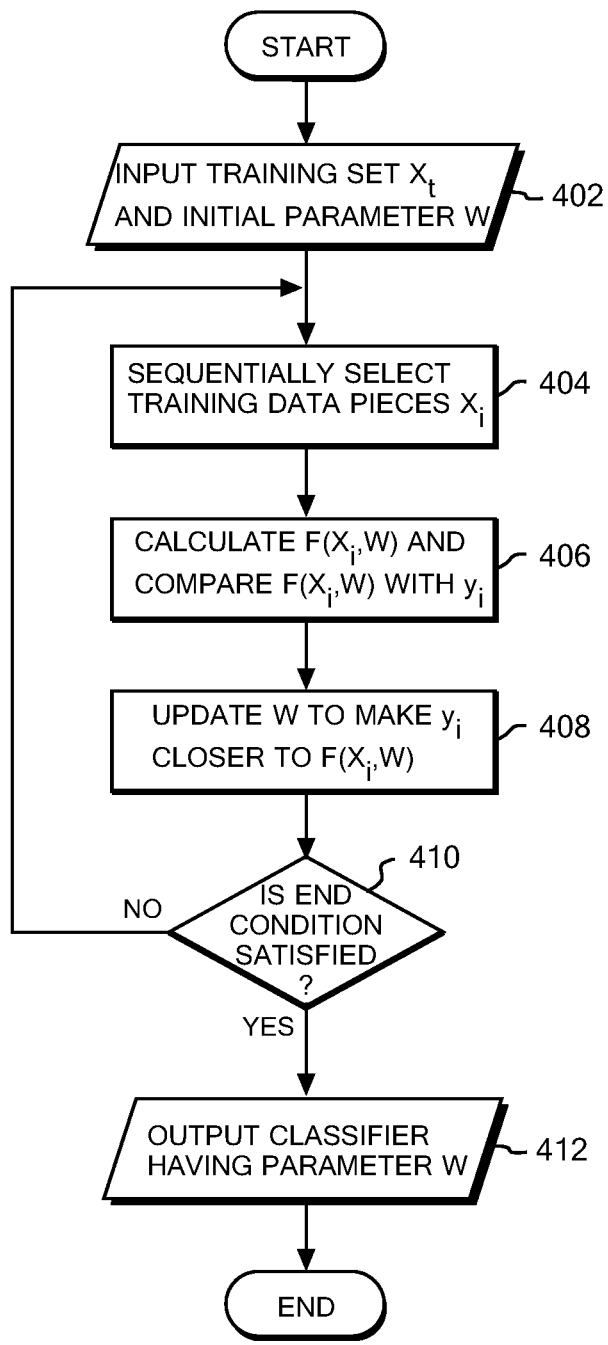
FIG. 4 is a flowchart of general processing of a classifier.

The following describes this learning by use of mathematical expressions and a flowchart. Precisely, in a flowchart in FIG. 4, a training set $X_t$ and an initial parameter w may be prepared and inputted in step 402. In this step, the function F(x,w) of the classifier may also be prepared together.

The function F(x,w) may be one of:
predicting a class of x as −1 when F(x,w)<0; and
predicting a class of x as +1 when F(x,w)≧0, for example.

In step 404, the training data samples $x_i$ may be sequentially selected. Next, in step 406, $F(x_i,w)$ may be calculated and the obtained solution may be compared with $y_i$.

In step 408, the parameter w may be updated to make $y_i$ closer to $F(x_i,w)$. An example of this update is as follows. Specifically:

$$w' = w + y_i * x_i.$$

The meaning of this equation can be understood more easily in the following way.

First, multiply both sides of the equation by $x_i$ and obtain $$w'*x_i = w*x_i + y_i * |x_i|^2.$$

In this equation, when $y_i = -1$, the value of $w'*x_i$ decreases by $|x_i|^2$, which is likely to result in F(x,w)<0. On the other hand, when $y_i = +1$, the value of $w'*x_i$ increases by $|x_i|^2$, which is likely to result in F(x,w)≧0.

The parameter w is updated by replacing w with the calculated parameter w'.

In step 410, a determination is made as to whether the updated w satisfies an end condition. The end condition is that the value of $$\sum_{i=1}^{n}(F(x_i, w) - y_i)^2 \quad \text{[Formula 6]}$$

may be equal to or less than a certain threshold, for example.

If it is determined that the end condition is not satisfied, the processing returns to step 404, and the next training data sample $x_i$ may be inputted. If it is determined that the end condition is satisfied, the processing moves to step 412, and the classifier having the parameter w may be outputted. Then, the processing ends.

The foregoing description is only for one of the general classifiers. Thus, some of more specific examples thereof will be described below.

<Linear Discriminator>

This is an example of one of the simplest linear discriminators. In this example, the parameter w may not be a scalar but a d-dimensional vector that has the same dimensions as the data x.

Figure 5:
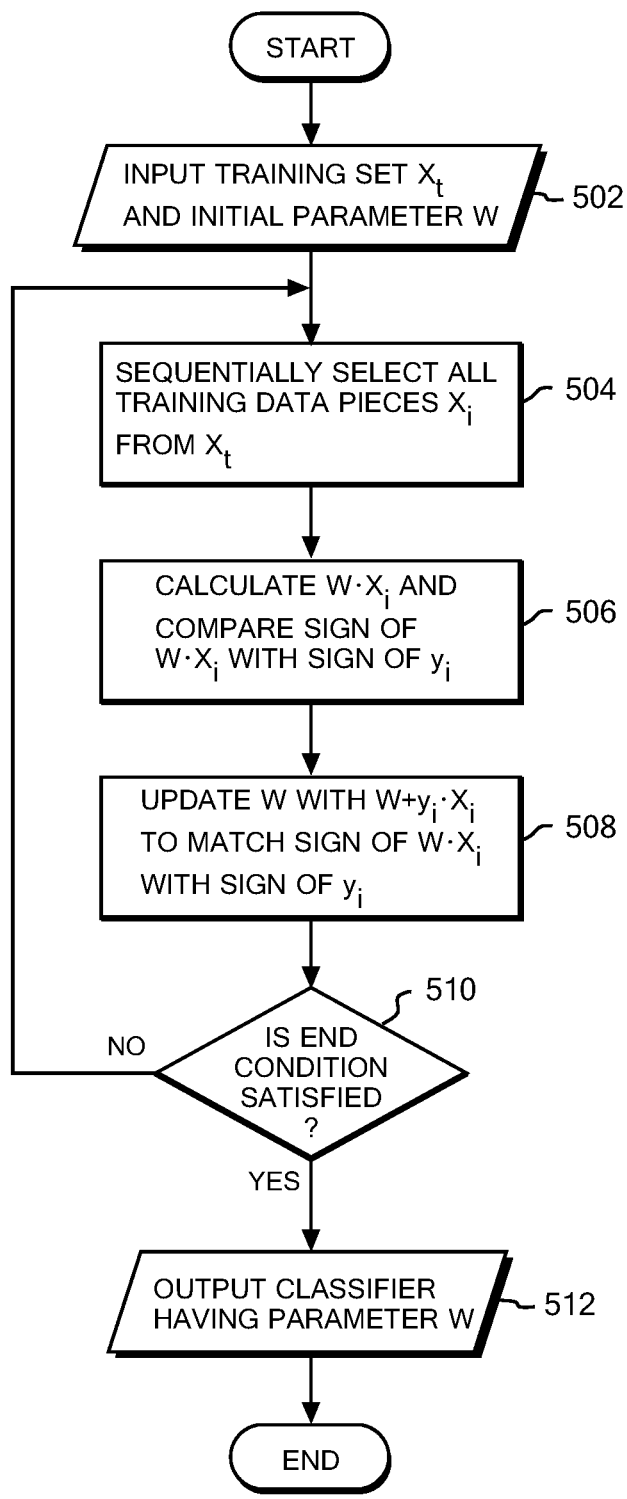
FIG. 5 is a flowchart of processing of a simple linear discriminator.

In a flowchart in FIG. 5, a training set $X_t$ and an initial parameter w are prepared and inputted in step 502. In this step, the function F(x,w) of the classifier is also prepared together. The parameter w is a vector as described above.

In this linear discriminator, F(x,w) is defined as F(x,w)=sgn(w·x). Here, w·x may denote an inner product of the vector w and the vector x, and sgn( ) is a function representing a sign.

Specifically, when w·x<0, a class of x is predicted as −1, and when w·x≧0, a class of x may be predicted as +1.

In step 504, the training data samples $x_i$ are sequentially selected. Then, in step 506, $F(x_i,w)$ may be calculated and the obtained solution may be compared with $y_i$.

In step 508, the value of the vector w may be updated by use of $w=w+y_i*x_i$ so that the values of $w·x_i$ and $y_i$ can be of the same sign of plus or minus. The significance of the update in the foregoing manner can be understood if both sides of $w=w+y_i*x_i$ is multiplied by $x_i$ to obtain an inner product in the substantially same manner as that already described relating to FIG. 4.

In step 510, a determination is made as to whether the updated parameter w satisfies an end condition. An equation for the determination as to the end condition may be the same as that in the processing in the flowchart in FIG. 4. If it is determined in step 510 that the end condition is not satisfied, the processing returns to step 504.

If it is determined in step 510 that the end condition is satisfied, the processing moves to step 512, and the classifier having the parameter w is outputted.

<Logistic Regression>

A logistic regression can be considered as a stochastic extension of linear discriminator. In this case, the parameter w is not a scalar but a vector that has the same dimensions as the data x.

Figure 6:
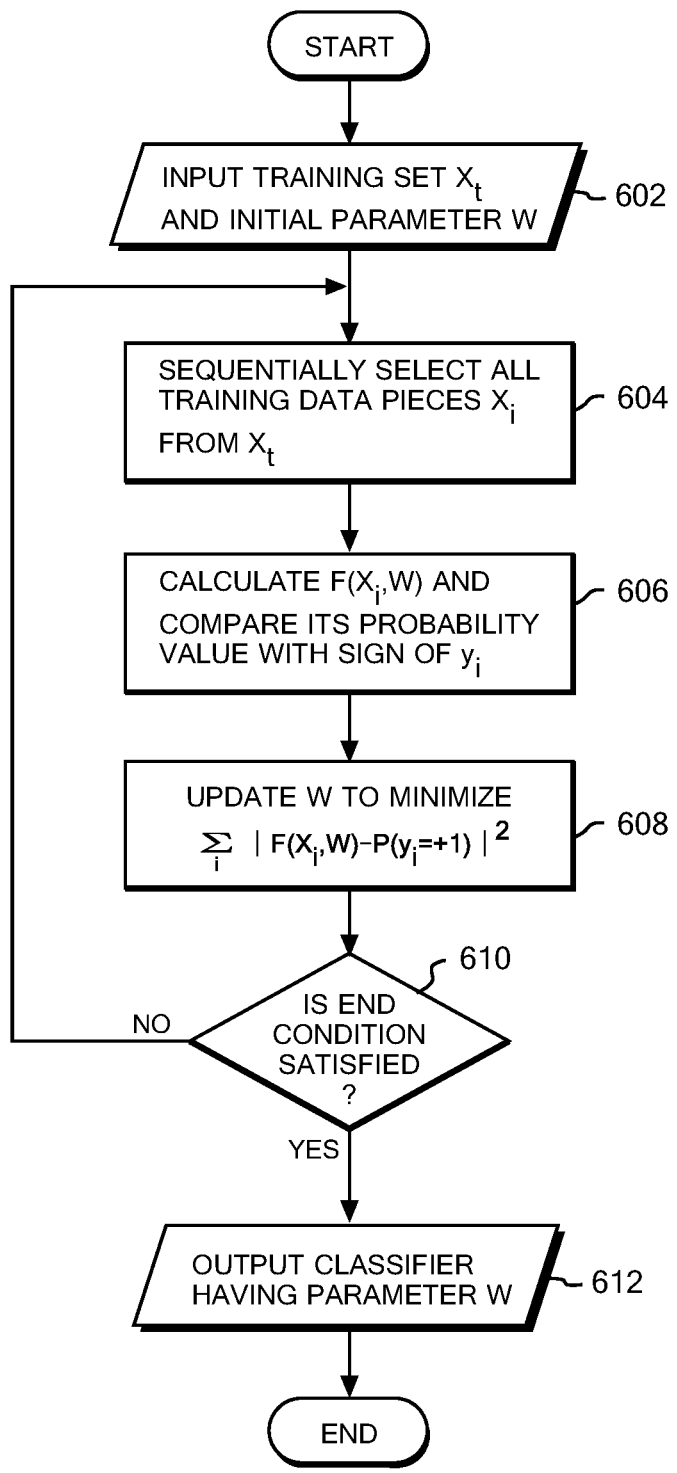
FIG. 6 is a flowchart of processing of a logistic regression.

In a flowchart in FIG. 6, a training set $X_t$ and an initial parameter w may be prepared and inputted in step 602. In this step, the function F(x,w) of the classifier may also be prepared. The parameter w is the vector as described above.

In this logistic regression, F(x,w) is given as F(x,w)=1/(1+exp(w·x)). Here, W·x denotes an inner product of the vectors w and x.

In step 604, the training data samples $x_i$ may be sequentially selected. Then, in step 606, $F(x_i,w)$ may be calculated by use of the foregoing equation, and the calculated probability value may be compared with $y_i$.

Specifically, when $F(x,w)<0.5$, a class of x is determined as −1, whereas when $F(x,w) \geq 0.5$, the class of x may be determined as +1.

Here, a function $P(y=+1)$ is defined as a function of returning 1 if the equation in brackets is true and of returning 0 if not. Then, in step 608, the parameter w may be updated so as to minimize the following equation:

$$\sum_{i=1}^{n} -[y_i \ln(1 - F(x_i, w)) + (1 - y_i) \ln F(x_i, w)]. \quad \text{[Formula 7]}$$

In step 610, a determination may be made as to whether the updated parameter w satisfies an end condition. The end condition is that the calculation result in step 608 is smaller than a certain threshold.

If it is determined in step 610 that the end condition is not satisfied, the processing returns to step 604.

If it is determined in step 610 that the end condition is satisfied, the classifier having the parameter w may be outputted in step 612.

<SVM>

A support vector machine (SVM) determines the parameter w based on the similarity in a training data set and classifies test data samples according to the sign of $F(x,w)$. In the calculation step for the similarity, the similarity can be determined with a non-linear boundary by means of the kernel trick using a certain type of non-linear function in place of an inner product of data. The parameter w is a parameter of a certain non-linear function, and may have dimensions different from the dimensions of the data x.

Figure 7:
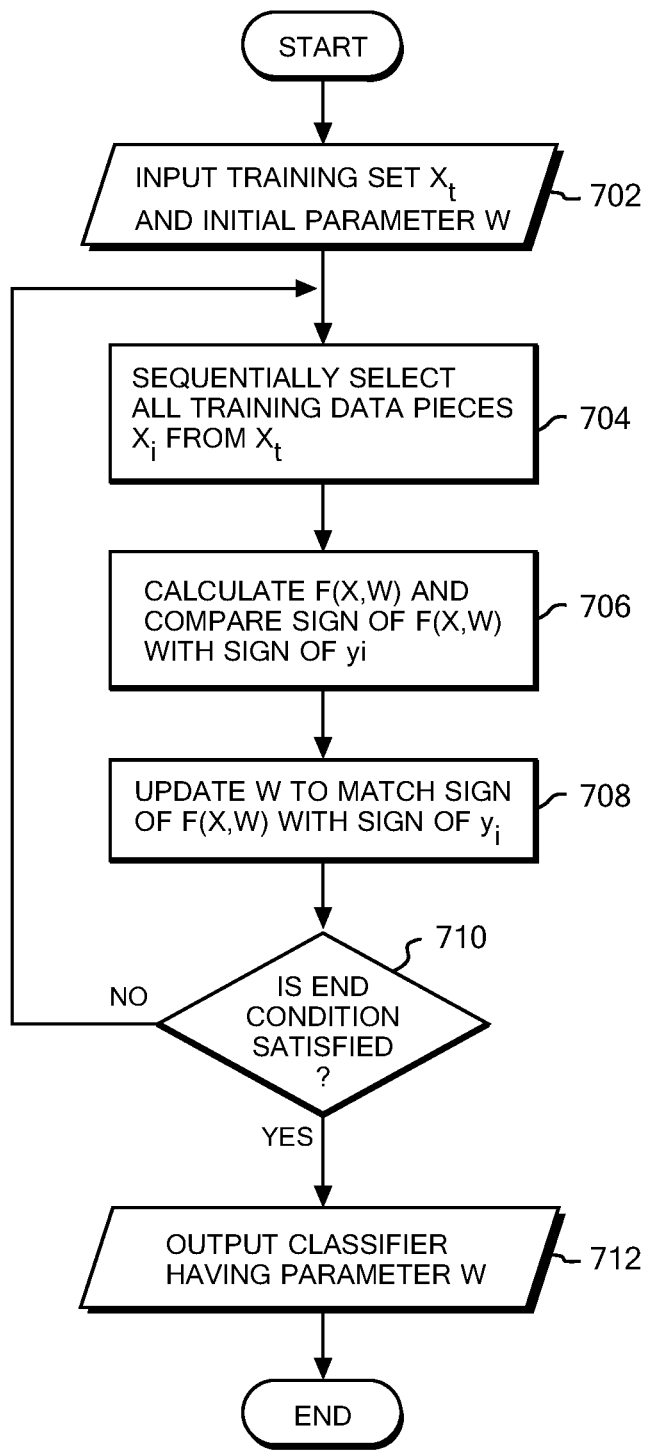
FIG. 7 is a flowchart of processing of a support vector machine (SVM).

In a flowchart in FIG. 7, a training set $X_t$ and an initial parameter w are prepared and inputted in step 702. In this step, the function $F(x,w)$ of the classifier may also be prepared.

The function $F(x,w)$ is given as $F(x,w) = \text{sgn}(x \cdot W_1 \cdot x + w_1 \cdot x)$, for example.

Here, $w = \{W_1(\text{matrix}), w_1(\text{vector})\}$.

$F(x,w)$ is a non-linear function and preferably is a two-dimensional function.

In step 704, the training data samples $x_i$ may be sequentially selected. Next, in step 706, $F(x,w)$ may be calculated from the above equation, and the obtained sign of $F(x,w)$ may be compared with $y_i$.

$F(x,w)$ takes a value of −1 or +1, and represents a class itself. In this regard, the SVM may be the same as the linear discriminator.

Specifically, when $x \cdot W_1 \cdot x + w_1 \cdot x < 0$, a class of x is predicted as −1, and when $x \cdot W_1 \cdot x + w_1 \cdot x \geq 0$, the class of x is predicted as +1.

In step 708, the parameter w may be updated so that the values of $F(x,w)$ and $y_i$ can be of the same sign of plus or minus. Incidentally, as described above, the parameter w includes both the matrix $W_1$ and the vector $w_1$, and the updating of the parameter w is to appropriately update both $W_1$ and $w_1$. The optimal parameter w can be obtained by use of a convex quadratic programming problem including all the training data, instead of the aforementioned sequential update.

In step 710, a determination is made as to whether the updated parameter w satisfies an end condition. An equation for the determination as to the end condition may be the same as that in the processing in the flowchart in FIG. 4. If it is determined in step 710 that the end condition is not satisfied, the processing returns to step 704.

If it is determined in step 710 that the end condition is satisfied, the classifier having the parameter w may be outputted in step 712.

<Decision Tree>

A decision tree is a classifier based on a concept completely different from the foregoing classifier obtained by modifying or extending the linear discriminator. More precisely, a parameter w in the decision tree is a set of rules to divide data samples x into two. The parameter w is expressed as:

$w = \{(\text{dimension number, threshold, class}), (\text{dimension number, threshold, class}), \ldots \}$.

Here, the dimension number is an element number of vector data x. The threshold is a value for making a determination for the value of the element. In essence, the rule (dimension number, threshold, class) indicates that the element of the specified numbered dimension in the data x belongs to the class if the value of the element is smaller than the threshold. In other words, the parameter w may directly correspond to the form of the decision tree.

In the case of the decision tree, a return value of the function $F(x,w)$ is a class of an end node in the decision tree.

Figure 8:
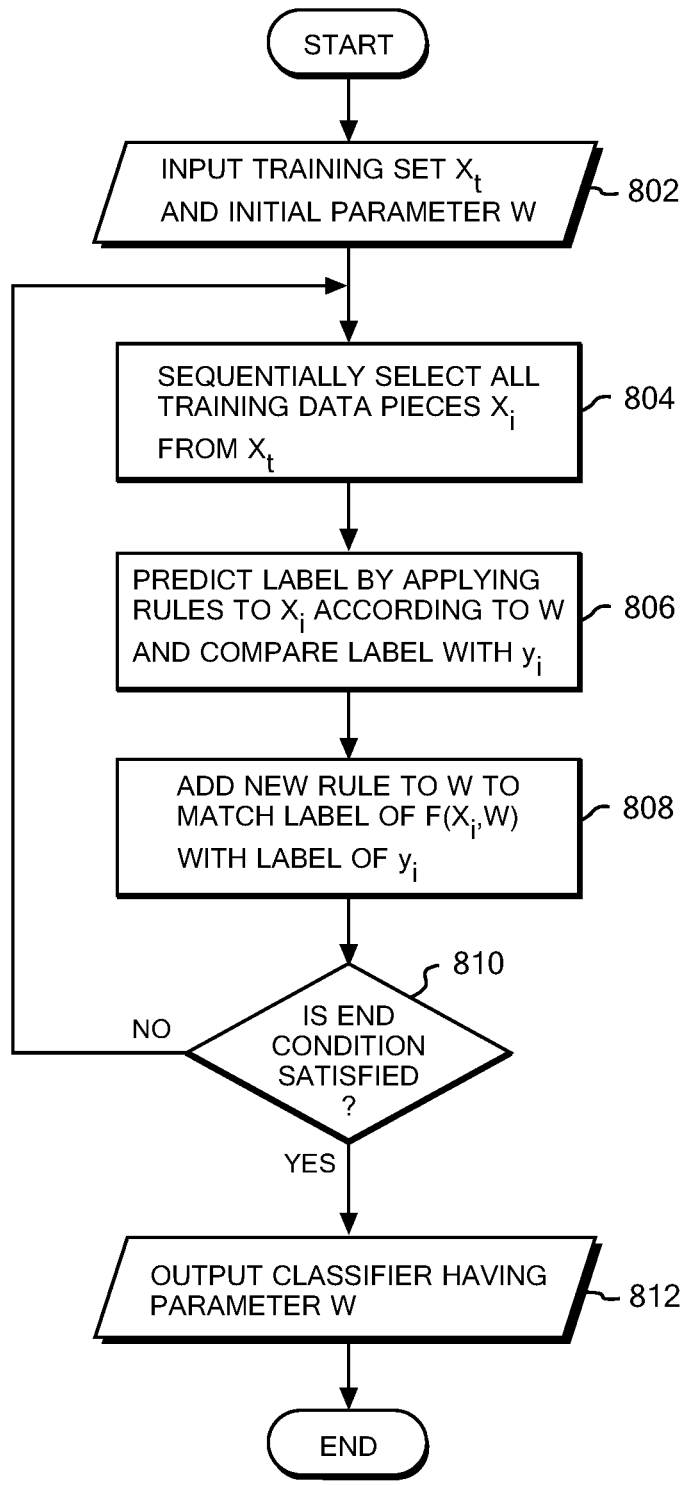
FIG. 8 is a flowchart of processing of a decision tree.

In a flowchart in FIG. 8, a training set $X_t$ and an initial parameter w may be prepared and inputted in step 802. In this step, the function $F(x,w)$ of the classifier may also be prepared.

In step 804, the training data samples $x_i$ may be sequentially selected. Next, in step 806, the label of the data sample $x_i$ may be predicted by applying the rules to the data sample $x_i$ according to the parameter w, and then the label obtained is compared with $y_i$.

In step 808, a new rule may be added to the parameter w so that the label of $F(x,w)$ can match $y_i$.

In step 810, a determination may be made as to whether an end condition is satisfied. The end condition is that an addition of a rule to the parameter w does not lead to an improvement in the classification accuracy, or that the size of the decision tree exceeds a certain defined value. If it is determined in step 810 that the end condition is not satisfied, the processing returns to step 804.

Based on the foregoing preparation, the processing according to this embodiment of the present invention will be described in detail by referring to FIG. 3 again. An appropriate binary classifier L may be prepared to carry out this processing. Any one of the aforementioned logistic regression, decision tree and SVM can be used as the binary classifier L, although a classifier other than the three can also be used.

In FIG. 3, the data set $X_A$ 311 and the data set $X_B$ 312 may be fetched, in a format such as CSV, to the main memory 106 or the hard disk drive 108 by the data input section 202 in FIG. 2.

The data set $X_A$ 311 and the data set $X_B$ 312 may be expressed as:

$$X_A = \{x_A^{(1)}, x_A^{(2)}, \ldots x_A^{(NA)}\}$$

$$X_B = \{x_B^{(1)}, x_B^{(2)}, \ldots x_B^{(NB)}\}. \quad \text{[Formula 8]}$$

<Virtual Labeling Section>

Next, the processing of the virtual labeling section 204 in FIG. 2 will be described. The virtual labeling section 204 assigns a label of +1 to each data sample of the data set $X_A$ 311 and assigns a label of −1 to each data sample of the data set $X_B$ 312.

$$\bar{X}_A = \{(x_A^{(1)}, +1), (x_A^{(2)}, +1), \ldots, (x_A^{(NA)}, +1)\}$$

$$\bar{X}_B = \{(x_B^{(1)}, -1), (x_B^{(2)}, -1), \ldots, (x_B^{(NB)}, -1)\} \quad \text{[Formula 9]}$$

In this manner, the data set $X_A$ bar 313 and the data set $X_B$ bar 314 shown in FIG. 3 may be prepared.

Then, the merged data set X bar may be prepared based on the following equation:

$$\bar{X} = \bar{X}_A \cup \bar{X}_B. \quad \text{[Formula 10]}$$

In the foregoing description, the labels of +1 and −1 may be assigned to data samples in the data set $X_A$ 311 and in the data set $X_B$ 312, respectively. However, the assigned labels are not limited to those. Any labels, which are different from each other, may be used for respective data sets.

<Change Detection Section>

Hereinafter, the processing of the change detection section 206 in FIG. 2 will be described. The number of divided blocks k and the significance level α may be given to the change detection section 206 in advance.

Next, the change detection section 206 calculates an allowable range γ from α. This calculation will be described later.

Thereafter, the classification accuracy p of the classifier L may be calculated by the sub routine CV and recorded.

$$p = CV(L, k, X \text{ bar})$$

Then, the change detection section 206 determines that there is a change if the following condition is satisfied, and that there is no change if not:

$$p \geq p_{bi}(1+\gamma).$$

Here, $p_{bi}$ may be given by the following equation:

$$p_{bi} = \frac{\max\{N_A, N_B\}}{N_A + N_B}. \quad \text{[Formula 11]}$$

The calculation of the sub routine CV includes the following processing.

(1) Given the number of divided blocks k, equally divide the X bar into k blocks. If the number of data samples of the X bar cannot be divided by k, the k-th divided block may include a less number of data samples than the other blocks. However, the number of divided blocks k may be selected so that the k divided blocks can include the number of data samples as equal as possible.

Then, these k-divided blocks are referred to as a $X^{(1)}$ bar, a $X^{(2)}$ bar, ..., $X^{(k)}$ bar, respectively.

(2) Select a given $X^{(j)}$ bar where $1 \leq j \leq k$, and train the classifier L by use of the rest of the groups $\{X^{(i)} \text{ bar} | i \neq j, 1 \leq i \leq k\}$. The learning and training of the classifier L is the same as described above.

(3) Pass the $X^{(j)}$ bar to the classifier L trained and calculate its classification accuracy $p_j$. The classification accuracy $p_j$ mentioned here indicates a degree of matching between two kinds of labels of the respective data samples of the $X^{(j)}$ bar. One of the two kinds of labels is the label assigned to each data sample in advance, and the other is the label predicted by the classifier L as a result of passing the data sample through the classifier L.

(4) Figure out $p_j$ for the $X^{(j)}$ bars of the k blocks.

(5) Figure out a return value p from the following equation:

$$p = \sum_{j=1}^{k} \frac{p_j}{k}. \quad \text{[Formula 12]}$$

<Change Analysis Section>

As shown in step 332 in FIG. 3, the change analysis section 208 trains the classifier L by use of the X bar. In step 334, by use of the feature selection function of the classifier L, every attribute contributing to the classification and its contribution rate are ranked and outputted together.

Here, an additional description will be given for the feature selection function of the classifier L. Assuming that each data sample $x_i$ is a d-dimensional vector, the "feature selection" includes: analyzing the data samples $x_i$ to find out which dimension (expressed as a synonym for a feature or attribute) has a value having a large influence on the analysis result; and excluding the value of the dimension having a less influence on the analysis result. In other words, the feature selection may select only features having high contribution rates to the classification, and to preferably delete the other features. In a broad sense, the feature selection indicates means for calculating the contribution rates of the data samples.

Here, the feature selection will be described more specifically by taking the example of the decision tree. In the outputted tree structure, a dimension used as a discrimination criterion at a higher node may have a larger influence on the analysis result, because a larger number of data samples are discriminated at a higher node in a test. On the other hand, a dimension never appearing in the decision tree may be useless for the classification and has a low contribution rate, even if the dimension takes whatever value. The feature selection of the classifier L may rank the dimensions according to certain criteria (for example, which level from the top each dimension is located at in the tree structure, or the like) and to output the ranked dimensions under these circumstances.

In the linear discrimination and the logistic regression, the parameter w, which is the d-dimensional vector having the same dimension as the data x, may be important for the feature selection. If the absolute value of a dimension of the parameter w is great, even a slight change of the value of its corresponding dimension of the data x may be largely reflected to the value of the outputted w·x. In contrast, if the value of a certain dimension of the parameter w is 0, the value of its corresponding dimension of the data x may not be related to the output value at all. As a result, the absolute values in the parameter w can be directly used as contribution rate ranks of the respective dimensions.

Any classifier construction algorithm does not necessarily include an explicit feature selection function. However, the classifier L can carry out the feature selection without depending on an algorithm but using a primitive method. For example, in the primitive method, a given j-th dimension data sample is removed from the entire data set X to obtain a data set X' of a d-1 dimensional vector. Then, the classifier L learns from the data set X'. At this time, if the classification accuracy is decreased, the j-th dimension is determined as having a high contribution rate. Instead, if the classification accuracy is not particularly decreased, the j-th dimension is determined as having a low contribution rate. Accordingly, it can be considered that the classifier L virtually performs a certain kind of feature selection to rank the features.

Here, an additional description will be provided to complement the foregoing description.

<Condition for the Coincidence of Distribution>

A condition for determining that the distributions $X_A$ and $X_B$ coincide with each other can be restated as a condition that "the classification accuracy of a binary classifier is less than $p_{bi}(1+\gamma)$." The explanation for this will be given here.

Assuming that $X_A$ and $X_B$ follow a certain single distribution, consider the classification accuracy when a binary classifier is trained by use of data attached with predefined virtual labels. On the basis of the above assumption, $p(x|y=+1)=p(x|y=-1)$ may be true for the data distribution with a given label y. This function may be expressed as f(x). From the viewpoint of a generative model, training a classifier is, in essence, to provide the classifier with the probability distribution of the label y obtained when the data x is given.

Based on the Bayes' theorem, $$p(y|x) = \frac{p(x|y)p(y)}{\sum_{y' \in \pm} p(x|y')p(y')} \quad \text{[Formula 13]}$$

$$= \frac{f(x)p(y)}{f(x) \sum_{y' \in \pm} p(y')}$$

$$= p(y)$$

is established. In essence, in this case, the label distribution may be determined only based on the prior distribution of the label. The label distribution may be determined based on a ratio of A or B, that is, is figured out as $N_A/(N_A+N_B)$ or $N_B/(N_A+N_B)$. A larger one of these two values must be taken as the classification accuracy. Eventually, the value $p_{bi}$ defined by Formula 11 may be obtained.

Alternatively, a simpler method can also be used. In this case, since the distributions of these two data sets are the same, the classification can be considered as the same as in the case of coin tossing (=a Bernoulli trial). Then, a probability q that the coin "showing heads" can be obtained from the maximum likelihood estimation. Assuming that the coin "showing heads" $N_A$ times and "showing tails" $N_B$ times, the log likelihood is $$\ln(q^{N_A}(1-q)^{N_B}) = N_A \ln q + N_B \ln(1-q). \quad \text{[Formula 14]}$$

Then, if the log likelihood is differentiated with respect to q and is made equal to 0, $q=N_A/(N_A+N_B)$ may be immediately obtained. Since a larger one of q and (1−q) should be taken as the classification accuracy, the classification accuracy $p_{bi}$ defined by Formula 11 may be eventually obtained as in the case described above.

<How to Give Parameter γ for the Range of Accuracy>

The value of the parameter γ in $p \geq p_{bi}(1+\gamma)$ of the change detection section can be determined reasonably by determining an appropriate value for the significance level α. Here, this reasonable determination for the parameter γ may be explained.

According to the above description, whether a change is significant is determined according to a difference between the classification accuracies p and $p_{bi}$, i.e., how different the classification is from a Bernoulli trial.

Here, assume that $N_A > N_B$ for the sake of simpler description. A binomial test using the number of occurrences $N_A$ of an observation A as a random variable can be employed for a branch condition in the change detection section. Specifically, if p satisfies $$\sum_{N_A=Np}^{N} \text{Bin}(N_A | N, p_{bi}) \leq \alpha \quad \text{[Formula 15]}$$

, a null hypothesis that "$N_A$ follows the binomial distribution" is rejected. That is to say, this classification result may be determined as almost impossible under the binomial distribution model. Here, $N=N_A+N_B$ and Bin is the following probability function of the binomial distribution:

$$\text{Bin}(N_A|N,p_{bi}) \equiv {}_N C_{N_A} p_{bi}^{N_A}(1-p_{bi})^{N-N_A}. \quad \text{[Formula 16]}$$

When N=1000 and $p_{bi}=0.5$, for instance, and if the significance level is set to 5% (α=0.05), the binomial distribution model is rejected (i.e., it is determined that there is a change) under the condition of a classification accuracy of 0.527 or greater. Alternatively, if the significance level is set to 1% (α=0.01), the binomial distribution model may be rejected under the condition of a classification accuracy of 0.538 or greater. The value of γ takes 0.054 and 0.076 for the respective significance levels.

Note that, when the expected value of the number of occurrences of positive instance or negative instance is 5 or greater, the Gaussian approximation of the binomial distribution may be considered as proper. Thus, the test may be carried out by use of the Gaussian distribution $N_A \sim N(N_A | Np_{bi}, Np_{bi}(1-p_{bi}))$.

Since the range of accuracy itself is not a value intuitively understandable, it may not be easy at all to determine the value of the range of accuracy practically. However, the significance confidence level α is a parameter having a universal meaning and is easy to set. Here, it should be noted that the relationship between the significance level and the parameter γ is derived without the assumption of any parametric probability model for data. Since the hypothesis is here tested for the classification accuracy of the classifier, there is no need to describe an explicit probability model for $X_A$ and $X_B$. Although estimating a probability density of high-dimensional data is very difficult, classifying such data is not so difficult if a classifier having an attribute selection function is used. In terms of avoiding the density estimation of a probability distribution, the aforementioned calculation method is the same as a non-parametric two sample test such as a nearest neighbor test. However, the non-parametric two sample test cannot provide any indicator for the change analysis problem. Moreover, in the case of either the nearest neighbor test or the high dimensional Kolmogorov-Smirnov test, an asymptotic distribution may only be theoretically obtained under ideal conditions, and accordingly, it may be difficult to obtain a confidence interval under various kinds of practical conditions.

Incidentally, as for the nearest neighbor test, refer to a document such as Norbert Henze, "A multivariate two-sample test based on the number of nearest neighbor type coincidences," Annals of Statistics Vol. 16, No. 2, pp. 772-783 (1988).

<Application to Labeled Data>

The procedures in the aforementioned example are basically for the change analysis on unlabeled data. However, the present invention can be applied to change analysis on data with discrete labels when the following procedures are used together with the preprocessing. The change analysis on the data with discrete labels is practically important since, if there are two real classifiers, which are not virtual ones, the change analysis can be used to obtain a detail of a difference between the two classifiers. Many of conventional studies on concept drift are carried out by focusing on the detection of drift, and thus have only an insufficient ability to explain a quality of change. According to the present invention, a change analysis problem concerning the classifiers can be solved if the problem of comparing labeled data is reduced to a problem of comparing unlabeled data.

Hereinbelow, consider labeled data sets $D_t$ and $D_s$. Specifically:

$$D_t = \{(x_t^{(1)}, y_t^{(1)}), (x_t^{(2)}, y_t^{(2)}), \ldots, (x_t^{(NA)}, y_t^{(NA)})\}$$

$$D_s = \{(x_s^{(1)}, y_s^{(1)}), (x_s^{(2)}, y_s^{(2)}), \ldots, (x_s^{(NB)}, y_s^{(NB)})\} \quad \text{[Formula 17]}$$

Here, $y_s^{(i)}$ denotes an i-th data sample of the data set $D_s$. The label may be assumed to be binary. In addition, a binary classifier L' is prepared.

The following preprocessing is to convert the two labeled data sets $D_t$ and $D_s$ into unlabeled data sets $X_A$ bar and $X_B$ bar, respectively. Among them, the $X_A$ bar features a difference between the two original data sets and the $X_B$ bar features a commonality between the two original data sets. The data sets $X_A$ bar and $X_B$ bar may be obtained by removing the originally given labels from the data sets $D_t$ and $D_s$ and by assigning virtual labels to the resultant data sets $D_t$ and $D_s$.

Sub routines of this preprocessing are described as follows:
(1) initialize both the data sets $X_A$ bar and $X_B$ bar to empty;
(2) train L' by use of $D_t$ to create a classifier $M_t$;
(3) train L' by use of $D_s$ to create a classifier $M_s$;
(4) classify $D_t$ by $M_s$, add misclassified x to the $X_A$ bar and add correctly-classified x to the $X_B$ bar;
(5) classify $D_s$ by $M_t$, add misclassified x to the $X_A$ bar and add correctly-classified x to the $X_B$ bar; and
(6) output "no change" if the misclassification ratio $\rho = N_A/(N_A + N_B)$ is equal to or less than a certain value, and output the $X_A$ bar and the $X_B$ bar if not, where $N_A$ and $N_B$ denote the sizes of the $X_A$ bar and the $X_B$ bar, respectively.

Instead of this, data samples may be classified into classes and the classified data samples may be used as input of unlabeled data samples.

<Simultaneous Comparison among Three or More Data Sets>

The present invention can also be used to compare three or more data sets. For example, if there are data sets $X_A$ bar, $X_B$ bar and $X_C$ bar, a difference among the three data sets can be featured by use of a three-class classifier. This is important in carrying out the aforementioned problem of comparing classifiers with each other. This is because a more detailed change analysis can be carried out if this problem is turned to a three-class problem by dividing data samples in a way that: a data sample with a label of +1 which has been misclassified as −1 is added to the $X_{A1}$ bar and a data sample with a label of −1 which has been misclassified as +1 is added to the $X_{A2}$ bar.

In the meantime, there are algorithms able to construct multi-class classifiers including a three-class classifier in principle. In this embodiment, the decision tree is one of the algorithms. In this case, a point to be modified is only to employ three classes A, B and C into which data samples are eventually determined to be classified. The logistic regression can be modified to be a three-class classifier by including multiple parameters w therein.

On the other hand, there are classifiers, such as the linear discriminator and the SVM, which are not suitable to the three-class classification if no modification is applied. In this case, such three-class classification problem can be solved by use of a combination of binary classifiers. More specifically, the three-class classification problem is divided into three binary classification problems of {A vs. (B or C)} {B vs. (A or C)} {C vs. (A or B)} by dividing and combining the three classes A, B and C into one class and the other two classes. For example, assume that three binary classifiers are constructed in the above three problems and yield classification results (B or C), (A or C), C for a certain data sample. In this case, the final output is C. A or B is outputted if the same condition is satisfied for A or B.

<Experiment 1: Change Analysis Based on Artificial Data>

Let's consider a data set $X_A$ bar composed of 500 samples extracted from a d=10 dimensional Gaussian distribution. Here, it may be assumed that the average is zero (a d-dimensional zero vector), and that the first variable (expressed as Attr1) has a standard deviation of 4 while the other variables each have a standard deviation of 1. Meanwhile, a data set $X_B$ bar may also be composed of 500 samples extracted from a d=10 dimensional normal distribution and having an average of zero (a d-dimensional zero vector). In the data set $X_B$ bar, only the second variable (expressed as Attr2) has a standard deviation of 4, while the other variables each have a standard deviation of 1.

The purpose of this experiment is to "identify Attr1 and Attr2 as producing a difference between the $X_A$ bar and the $X_B$ bar" only by analyzing the data samples without having information on such a generative model. In this experiment, a decision tree (C4.5) was used as a classifier L in consideration of its explanation capability. In addition, k=10 and γ=0.05 were used (equivalent to a significance level of approximately 5%).

Figure 9:
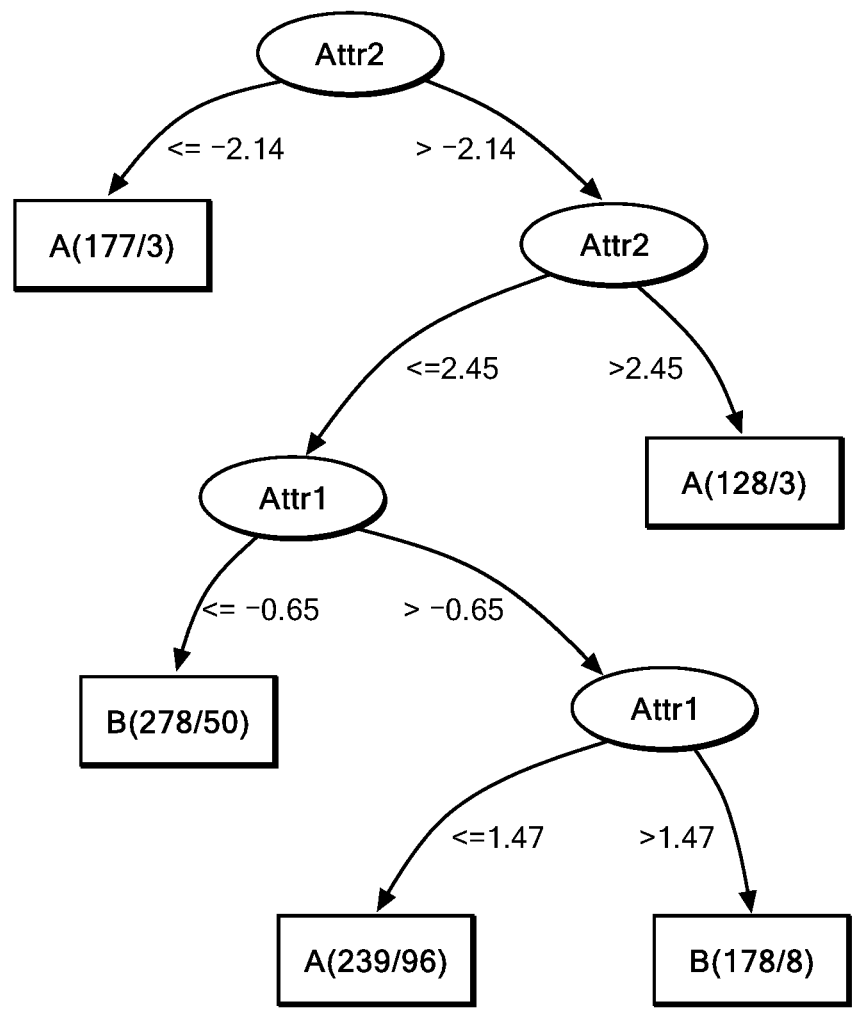
FIG. 9 is a diagram showing a decision tree applied to a change analysis on artificial data.

As a result of the experiment, the classification accuracy obtained by the sub routine CV was approximately 80% and exceeded the significance level largely. FIG. 9 shows a change model generated by the change analysis section. Numbers in a rectangular such as 177/3 indicate (the number of samples included in the node)/(the number of wrongly classified samples). FIG. 9 apparently shows that the highest four branch rules depend on Att1 or Attr2 and that these two attributes were correctly identified.

<Experiment 2: Change Analysis on Data of Bankrupt Company>

A change analysis was performed on email data of a certain bankrupt company, which is an example of real data. This company went into bankruptcy at the end of 2001. The email data during the bankruptcy process is open to the public for research use. The data set includes approximately 270,000 emails that each are expressed in the Bag-Of-Words format. Two groups of 100 and 150 words were selected in descending order of frequency, and feature vectors representing the frequencies of the selected words were generated by using TF-IDF (term frequency-inverse document frequency) heuristics.

A problem here is to examine what difference would be detected between two sets of emails of the first half and the second half in the second half of year 2001 (that is, the third quarter (3Q) and the fourth quarter (4Q) in 2001). The decision tree (C4.5) was used as the classifier with the setting k=10.

The classification accuracies were checked by the sub routine CV Here, the feature vectors of the third quarter and the fourth quarter in the second half of the year were compared with each other. As a result, the obtained classification accuracies were 62.8% and 64.1% when d=100 and d=150, respectively. These values are far greater than the 5% significance level, and may show that there is a significant difference between the third quarter (3Q) and the fourth quarter (4Q).

Figure 10:
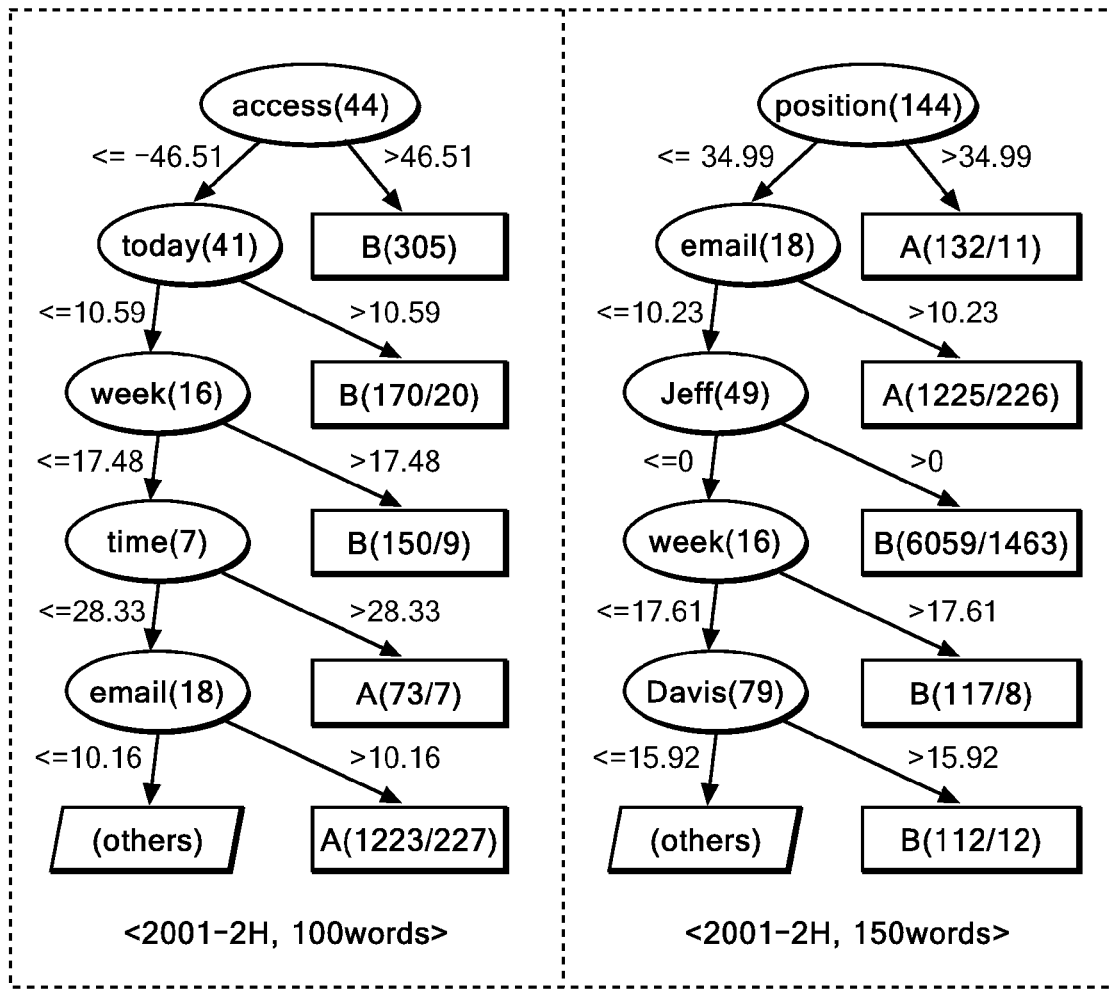
FIG. 10 is a diagram showing a decision tree applied to a change analysis on emails in a company.

A change analyzer was used to examine detailed information on the difference. The result is shown in FIG. 10. A number in each rectangular in FIG. 10 has the same meaning as that in FIG. 9. In FIG. 10, only the top 5 nodes are shown and a rank in the frequency is indicated by a number in each node such as (44).

In the experiment, the feature vectors were generated by simply using words in the descending order of the frequency. Thus, it apparently seems that general terms such as email, week and today largely contribute to the classification. This tendency appears more strongly in the analysis of d=100. The reason for this can be understood from the fact that a small occasion but No may be inputted on another occasion, i.e., the inputted values depend on when the values are inputted and thus may differ from each other (one of factors of such difference is the replacement of the person in charge of the database management).

The purpose of this example is to find what kind of change in the policy for inputting the importance was caused by the replacement of the person in charge.

TABLE 1

| ID | Date | Staff No. | Staff Name | Category | Title | Organization | Group | Importance |
|---|---|---|---|---|---|---|---|---|
| 1 | 2003/4/20 | A1234 | Yamada Taro | Best paper award | presenter | ACM | No group | Yes |
| 2 | 2003/5/12 | A1357 | Kimura Hanako | standards panel | member | W3C | W3C | Yes |
| 3 | 2003/5/13 | A2268 | Satoh Jiro | conference organization | Chair | domestic | domestic | No |
| ... | ... | ... | ... | ... | ... | ... | ... | ... | number d of selected words include general words at such a high ratio that the same tendency also appears in the change analysis model. On the other hand, a larger number d of selected words include a larger number of words having specific meanings.

When FIG. 10 is observed in this regard, an interesting fact can be found. In the change analysis model of d=150, non-general terms such as position, Jeff and Davis are selected to properly explain the difference between the two data sets. As the bankruptcy of the company became more likely to occur, many emails concerning positions were probably exchanged between the people in the company around the third quarter. Regarding Jeff and Davis, in fact, the ex-CEO of the bankrupt company was Jeffrey K. Skilling while the governor of California was Gray Davis when the company became bankrupt. It is highly possible that the people often expressed their resentments against these two persons in the company on the edge of bankruptcy.

The above result is a direct verification example for the effectiveness of the present invention since the result shows that the present invention enables the finding and obtaining of analytical information on the dynamics inside the company without using any internal information directly.

<Experiment 3: Change Analysis on Database>

Hereinafter, a specific example will be shown for the change analysis problem on labeled data, which has been described in the section <Application to Labeled Data>. Here, consider the case where a database for managing academic conference activities of a certain organization is analyzed in terms of a change in the importance of each activity. This database includes inputted activity data samples, and each activity data sample is attached with a binary label that indicates whether the activity is important or not (from a certain point of view). Each inputted activity may be expressed in the form of 15 dimensions (d=15) such as a record ID, date, staff number, staff name, title, category, organization and group. The column for importance includes information indicating whether each inputted data sample of an activity is important or not. One of two values Yes and No may be inputted to the column for importance. The values are not automatically inputted to the column for importance, but manually inputted by a person in charge of the database management according to a guideline updated every year or conventional rules. Accordingly, even when activities of the same content were carried out, Yes may be inputted on one

[Assignment of Virtual Labels]

Two data sets of quarters before and after a date (Sep. 1, 2006) when the person in charge was replaced to another person are extracted from the above database. These two data sets respectively correspond to $D_t$ and $D_s$, which have been described in the section <Application to Labeled Data>. Here, data samples are assigned four-valued virtual labels of "Yes->Yes," "Yes->No," "No->No," and "No->Yes" representing variations in the change of the importance.

As preprocessing, according to the procedures shown in the section <Application to Labeled Data>, data sets $X_A$ bar, $X_B$ bar, $X_C$ bar and $X_D$ bar were initialized to be empty and thus prepared. Then, (1) a binary classifier L' was trained by using $D_t$ to create a classifier $M_t$; and
(2) the binary classifier L' was trained by using $D_s$ to create a classifier $M_s$. Precisely, decision trees were generated as the classifiers $M_t$ and $M_s$.
(3) The data samples in $D_t$ were classified by $M_s$. Here, these data samples were classified by four values instead of 2 values. Thus, a data sample whose correct value is Yes was added to the $X_A$ bar if wrongly classified as No, or was added to the $X_B$ bar if correctly classified as Yes, while a data sample whose correct value is No was added to the $X_C$ bar if wrongly classified as Yes, or was added to the $X_D$ bar if correctly classified as No. Similarly,
(4) The data samples in $D_s$ were classified by $M_t$, and were added to the $X_A$ bar, the $X_B$ bar, the $X_C$ bar and the $X_D$ bar. An X bar denotes a total of the $X_A$ bar, the $X_B$ bar, the $X_C$ bar and the $X_D$ bar with a size $N_A$, size $N_B$, size $N_D$ and size $N_D$, respectively.

[Change Detection]

In principle, here, the wrong classification ratio $\rho=(N_A+N_C)/(N_A+N_B+N_C+N_D)$ should be calculated and compared with a threshold to determine the presence/absence of the change. However, this example is based on the assumption that there is a certain change in the policy for assigning labels due to the replacement of the person in charge. For this reason, this example omits description for the evaluation on the significance level of the change.

[Change Analysis]

Figure 11:
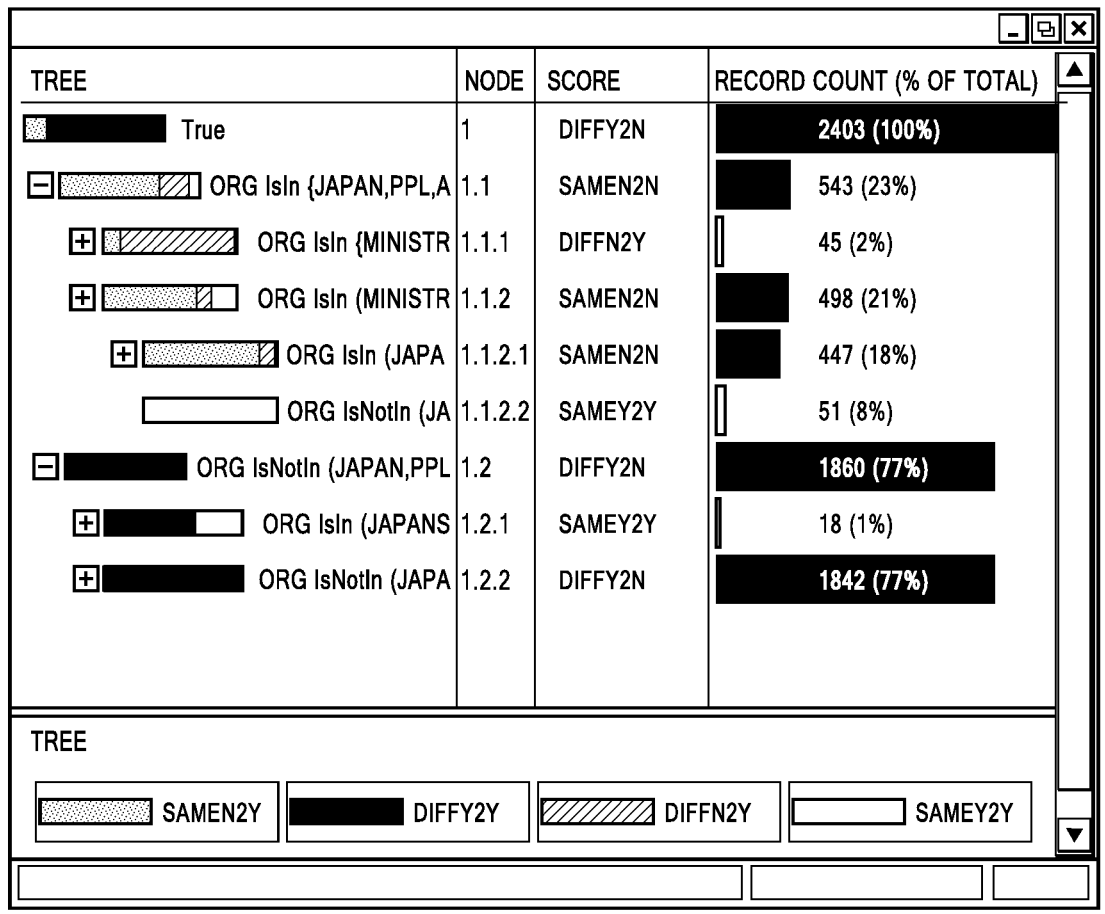
FIG. 11 is a diagram showing a decision tree applied to a change analysis on a database.

A classifier L was trained by using the X bar assigned the virtual labels. To be more precise, a decision tree was generated as shown in FIG. 11.

In the generated decision tree, "SAMEY2Y" denotes Yes->Yes; "SAMEN2N", No->No; "DIFFY2N", Yes->No; and "DIFFN2Y", No->Yes. FIG. 11 clearly shows that an explanatory variable ORG is often used in tests of respective nodes in the decision tree. In order to analyze the decision tree in more detail, a path to DIFFY2N or DIFFN2Y needs to be found out. Based on the finding, it is possible to identify which factor brought about a change in the policy for determining the importance. For example, let's find a node classified as DIFFY2N ("Yes->No"). In this instance, a node 1.2.2 may include many data samples indicating a change of Yes->No. Thus, it may be possible to identify a factor of a concept drift by examining tests in the path to the node 1.2.2 in the decision tree. Based on the generated decision tree, the node 1.2.2 may be identified as a node including data samples having node test results that: a first test (test of a node 1) as to whether ORG is in {"JAPAN", "PPL", "ARTIFICIAL INTELLIGENCE", "DATABASE SOCIETY OF JAPAN", "HPC", "SSME", "ACM SIGMOD JAPAN"} is False; and a next test (test of a node 1.2) as to whether ORG is in {"JAPAN SOCIETY OF MECHANICAL ENGINEERING", "INFORMATION SECURITY"} is False. In this instance, Yes was inputted at 3Q in 2006 and No was inputted at 4Q in 2006 for the importance relating to ORG values not included in the tests of the node 1 and the node 1.2. In addition, such a change occupies as much as 77% of all the data samples.

Next, consider the case of finding a data sample having a change of DIFFN2Y ("No->Yes"). In this instance, a node 1.1.1 corresponds to such a change. Similarly, it may be possible to know the content of a concept drift by examining the tests of the node 1 and a node 1.1. In addition, it may also be found that the data samples having a change in this rule occupy only about 2% of all the data samples.

Consequently, by analyzing the decision tree in this way, we found out the contents of changes between the data set of 3Q in 2006 inputted by the former person in charge and the data set of 4Q in 2006 inputted by the new person in charge.

Although the preferred embodiments of the present invention have been described in detail, it should be understood that various changes, substitutions and alternations can be made therein without departing from spirit and scope of the inventions as defined by the appended claims.

What is claimed is:

1. A change analysis system, comprising:
    a virtual labeling module configured to prepare by the performance of a computer processor a labeled data set by assigning a first virtual label to each data sample in a first data set, and for assigning a second virtual label to each data sample in a second data set, the second virtual label being different from the first virtual label;
    a classifier configured to classify the data samples in the labeled data set by use of the virtual labels; and
    an accuracy determination module configured to determine the accuracy of the classification of the data samples in the labeled data set based on the number of blocks of data in the labeled data set that are divided;
    a change analysis module configured to send the classifier the labeled data set and output a contribution rate at which each of a plurality of attributes contribute to classification of the first data set and the second data set, wherein the change analysis module detects change in the first data set by comparing the first data set with the second data set.

2. The system according to claim 1, wherein the classifier is a logistic regression.

3. The system according to claim 1, wherein the classifier is a support vector machine.

4. The system according to claim 1, wherein the classifier is a decision tree.

5. The system according to claim 1, wherein the first and second virtual labels are +1 and −1, respectively.

6. A change analysis system for performing, by means of a computer function, a change analysis on two data sets to be compared to find a change there between, the change analysis system comprising:
    a virtual labeling module configured to prepare by the performance of a computer processor a labeled data set by assigning a first virtual label to each data sample in a first data set, and for assigning a second virtual label to each data sample in a second data set, the second virtual label being different from the first virtual label;
    a change detection module configured to detect a significant change in the labeled data set,
        wherein a determination of whether the change in the labeled data set is significant is based on a difference in accuracy in classification of the first data set and the second data set, and
        wherein the accuracy in classification of the first data set and the second data set is based on the number of blocks of data in the labeled data set that are divided;
    a classifier configured to classify the data samples in the labeled data set by use of the virtual labels; and
    a change analysis module configured to send the classifier with the labeled data set and output a contribution rate of every attribute contributing to classification of the classifier, in response to an event in which the change detection module detects the significant change.

7. The system according to claim 6, wherein the classifier is a logistic regression.

8. The system according to claim 6, wherein the classifier is a support vector machine.

9. The system according to claim 6, wherein the classifier is a decision tree.

10. The system according to claim 6, wherein the first and second virtual labels are +1 and −1, respectively.

11. A method for performing, by means of a computer function, a change analysis on two data sets to be compared to find a change therebetween, the change analysis method comprising the steps of:
    preparing a labeled data set by the performance of a computer processor by assigning a first virtual label to each data sample in a first data set, and assigning a second virtual label to each data sample in a second data set, the second virtual label being different from the first virtual label;
    detecting a significant change in the labeled data set,
        wherein whether a significant change has occurred in the labeled data set is based upon comparing the difference between the first data set and the second data set with a threshold derived from a confidence level of a binomial distribution; and
    sending the classifier the labeled data set and outputting a contribution rate of every attribute contributing to classification of the classifier, in response to an event in which the change detection detects the significant change.

12. The method according to claim 11, wherein the classifier is a logistic regression.

13. The method according to claim 11, wherein the classifier is a support vector machine.

14. The method according to claim 11, wherein the classifier is a decision tree.

15. The method according to claim 11, wherein the first and second virtual labels are +1 and −1, respectively.

16. A change analysis program stored on a computer storage medium for performing, by means of a computer function, a change analysis on two data sets to be compared to find a change there between, the change analysis program causing the computer to execute the steps of:

preparing a labeled data set by assigning a first virtual label to each data sample in a first data set, and assigning a second virtual label to each data sample in a second data set, the second virtual label being different from the first virtual label;

detecting a significant change in the labeled data set, wherein whether the significant change has occurred in the labeled data set is based upon comparing the difference between the first data set and the second data set with a threshold derived from a confidence level of a binomial distribution; and sending the classifier the labeled data set and outputting a contribution rate of every attribute contributing to classification of the classifier, in response to an event in which the change detection detects the significant change.

17. The program according to claim 16, wherein the classifier is a logistic regression.

18. The program according to claim 16, wherein the classifier is a support vector machine.

19. The program according to claim 16, wherein the classifier is a decision tree.

20. The program according to claim 16, wherein the first and second virtual labels are +1 and −1, respectively.

* * * * *